(12) United States Patent
Mesguich Havilio (10) Patent No.: US 10,719,914 B2
(45) Date of Patent: *Jul. 21, 2020

(54) UNIVERSAL DIGITAL CONTENT ZOOMING TECHNIQUES

(71) Applicant: Barnes & Noble College Booksellers, LLC, Basking Ridge, NJ (US)

(72) Inventor: Amir Mesguich Havilio, Palo Alto, CA (US)

(73) Assignee: Barnes & Noble College Booksellers, LLC, Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/392,058

(22) Filed: Apr. 23, 2019

(65) Prior Publication Data
US 2019/0251659 A1    Aug. 15, 2019

Related U.S. Application Data

(63) Continuation of application No. 14/485,010, filed on Sep. 12, 2014, now Pat. No. 10,319,073.

(51) Int. Cl.
| | |
|---|---|
| *G06F 17/00* | (2019.01) |
| *G06T 3/40* | (2006.01) |
| *H04B 10/2507* | (2013.01) |
| *G06F 3/0481* | (2013.01) |
| *G06F 40/114* | (2020.01) |

(52) U.S. Cl.
CPC .............. *G06T 3/40* (2013.01); *G06F 3/0481* (2013.01); *G06F 40/114* (2020.01); *G06F 2203/04806* (2013.01); *H04B 10/2507* (2013.01)

(58) Field of Classification Search
None
See application file for complete search history.

(56) References Cited

U.S. PATENT DOCUMENTS

| | | |
|---|---|---|
| 2002/0000998 A1 | 1/2002 | Scott et al. |
| 2005/0001931 A1 | 1/2005 | Kahn |

(Continued)

OTHER PUBLICATIONS

Kwang Bok Lee et al., The Embedeed Zooming Applications for Personal Digital Assistants, Jan. 1, 2003, IEEE, pp. 109-116 (Year: 2003).*

(Continued)

*Primary Examiner* — Tam T Tran
(74) *Attorney, Agent, or Firm* — Finch & Maloney PLLC (57) ABSTRACT

Techniques are disclosed for digital content zooming. In one example case, the hypotenuse of the digital content (or a combination of both height and width values of the content) is initially set to provide the 100% zoom level and is subsequently used to resize or zoom that content. In particular, an arbitrary constant that is independent of the content itself is used to define the initial or 100% zoom level at which the content is initially displayed. The arbitrary constant may be, for example, a hypotenuse size in pixels, or a specific combination of height and width in pixels. In one specific example, the arbitrary constant can be selected based on, for instance, an average of current physical screen and/or virtual viewing window resolutions' hypotenuse sizes, in pixels. In any case, the arbitrary constant can be used to set the initial size of the content, and to compute zoom steps.

20 Claims, 6 Drawing Sheets

(56) References Cited

U.S. PATENT DOCUMENTS

| | | | |
|---|---|---|---|
| 2005/0068339 A1 | 3/2005 | Lipsky et al. | |
| 2009/0109243 A1* | 4/2009 | Kraft | G06F 3/0481 |
| | | | 345/660 |
| 2013/0007603 A1* | 1/2013 | Dougherty | G06T 11/60 |
| | | | 715/251 |
| 2013/0057731 A1 | 3/2013 | Rodriguez et al. | |
| 2013/0155290 A1 | 6/2013 | Huang | |
| 2014/0325345 A1* | 10/2014 | Vano | G06F 17/211 |
| | | | 715/236 |

OTHER PUBLICATIONS

Tobias Reinhard et al., An Improved Fisheye Zoom Algorithm for Visualizing and Editing Hierarchical Models, Oct. 1, 2007, IEEE Computer Society, pp. 1-10 (Year: 2007).*

Jakobsen et al., "Interactive Visualizations on Large and Small Displays", IEEE Computer Society, Dec. 2013, vol. 19, No. 12, pp. 2336-2345.

Lukac et al., "Vector Operators for Color Image Zooming", IEEE ISIE, Jun. 2005, pp. 1273-1277.

* cited by examiner

Use Cases:
Content Zoom Feature = Hypotenuse
Content Zoom Feature = Length and Width Combination

UNIVERSAL DIGITAL CONTENT ZOOMING TECHNIQUES

REFERENCE TO PRIOR APPLICATION

This application is a continuation of U.S. patent application Ser. No. 14/485,010 (filed 12 Sep. 2014), the entire disclosure of which is hereby incorporated by reference herein.

FIELD OF THE DISCLOSURE

This disclosure relates to zooming techniques, and more particularly, to zooming techniques for consistency across different resolutions and aspect ratios, with respect to both the content itself and the physical display screen or virtual window.

BACKGROUND

Electronic computing devices such as desktops, laptops, tablets, eReaders, mobile phones, smart phones, personal digital assistants (PDAs), and other such electronic computing devices are commonly used for displaying consumable content. The content may be, for example, an eBook, an online article or blog, images, a movie or video, a map, just to name a few types. Such devices are also useful for displaying a user interface that allows a user to interact with an application running on the device. The user interface may include, for example, one or more touch screen controls, one or more displayed labels that correspond to nearby hardware buttons, and/or otherwise selectable user interface control features. The display may be backlit or not, and may be implemented for instance with a CRT screen, an LED or plasma screen, or an electrophoretic display. The displayed content can be reduced or expanded in size with zooming. Zooming generally refers to the ability to resize digital content at page level, and can also be selectively applied to a given content page such as text-only zoom of a multimedia content page.

DETAILED DESCRIPTION

Techniques are disclosed for digital content zooming. The techniques allow for consistency across different resolutions and aspect ratios, so as to reduce variation in zoom behavior within and across content as well as within and across physical display screens and virtual windows. In one example case, a feature of the digital content to be displayed (such as the hypotenuse of the content, or a combination of both the height and width of the content) is initially set to an arbitrary size to provide the initial zoom level (also referred to herein as the 100% zoom level) and is subsequently used to resize or zoom that content. In particular, an arbitrary constant that is independent of the content itself is used to define the initial or 100% zoom level at which the content is initially displayed. The arbitrary constant may be, for example, a hypotenuse size in pixels, or a specific combination of height and width in pixels. In one specific example case, the arbitrary constant can be selected based on, for instance, an average or median of current physical screen and/or virtual viewing window resolutions' hypotenuse sizes, in pixels. The set of physical screens and/or virtual viewing windows used to determine the arbitrary constant can be selected or otherwise provided by the user or automatically selected based on detected use cases or otherwise automatically determined based on an established standard or default. In any case, the arbitrary constant can then be used to set the initial size of the content, and then subsequently used to compute any zoom steps (e.g., −25% or +30%, etc).

General Overview

In general, predictable and expected or otherwise consistent behavior in a user experience with a given product tends to reduce friction for the user using a product, which in turn may increase that user's satisfaction. In the specific case of zooming into digital content on a given computing device, various issues effectively preclude achieving such predictable and expected behavior. One such issue is that the content to be zoomed may have different aspect ratios. For instance, one page of a given digital document may have a first aspect ratio and another page of that same document may have another aspect ratio different from the first. Likewise, one digital document to be viewed might be entirely in one aspect ratio while another digital document to be viewed is entirely in another aspect ratio. Another such issue is that the original resolution of the content might vary. For instance, one page of a given digital document may have a first resolution and another page of that same document may have another resolution different from the first. Likewise, one digital document to be viewed might be might be entirely in one resolution while another digital document to be viewed is entirely in another resolution (i.e., looks smaller than the other when at maximum resolution). Yet another issue is that the screen resolution or size of the screen and/or virtual viewing window from which the content is accessed might vary. For instance, the size of the physical display screen can vary greatly from device to device (e.g., from a mobile device such as smartphone to a tablet device to a widescreen desktop flat panel). Likewise, any given display typically has one or more resolutions that can be set by the display driver. Also, many operating systems automatically resize a given viewing pane or so-called window within a physical screen depending on context, or allow the user to resize that window. To this end, even while looking at a piece of content, the effective 'canvas' (window) within which it is displayed might change in aspect ratio (at least one of height and width dimension of window may change). Such issues basically sum up to two main groups of variables: original content comes in all aspect ratios and resolutions, and display systems also come in all aspect ratios and resolutions. These variables mean that the zoom percentages displayed to the user, and the amount by which a piece of content zooms-in/out every time the zoom action is invoked, may vary thereby causing an inconsistent user experience.

Thus, and in accordance with an embodiment of the present invention, zooming techniques are provided that reduce variation in zoom behavior within and across content as well as within and across physical display screens and virtual windows, thereby providing a relatively consistent behavior for the user without necessitating the displayed digital content to be normalized and edited on an ad hoc or piece-by-piece basis. The techniques may be implemented in a number of ways. In one example case, the hypotenuse of the digital content (or a combination of both height and width of the content) is initially set to provide the 100% zoom level and is subsequently used to resize or zoom that content. In particular, an arbitrary constant that is independent of the content itself is used to define the initial or 100% zoom level at which the content is initially displayed. The arbitrary constant may be, for example, a hypotenuse size in pixels, or a specific combination of height and width in pixels, or some other content feature. In one specific example case, the arbitrary constant can be selected based on, for instance, an average of current physical screen and/or virtual viewing window resolutions' hypotenuse sizes, in pixels. The set of physical screens and/or virtual viewing windows used to determine the arbitrary constant can be selected or otherwise provided by the user or automatically selected based on detected use cases or otherwise automatically determined based on an established standard or suitable default. In any case, the arbitrary constant can then be used to set the initial size of the content, and then subsequently used to compute any zoom steps (e.g., −25% or +30%, etc). The effect is that if in one display screen or window an image of given content is one square inch at 100% zoom, the image of that content is also one square inch at 100% zoom in any another display screen or window, in accordance with an embodiment. Furthermore, if every zoom increase (or decrease, as the case may be) in one given display screen or window leads to everything being one square inch bigger (or smaller), then every zoom step in any another display screen or window will also make the content one square inch bigger (or smaller).

In an embodiment, the combination of an arbitrary constant against which all digital content is zoomed and a ratio between content width and content height, as opposed to just one, controls for many zooming variables such as original content dimensions and aspect ratio, and user screen resolution and size. This combination also provides the user with normalized percentages (based on the arbitrary constant) so that, for example, 150% zoom is optically very similar across different pieces of content seen across different display screens, such as from a mobile device to a large television or flat panel. Despite the fact that original content and display systems can effectively present variable aspect ratios and resolutions, the techniques reduce or otherwise mitigate the occurrence of zooming increments and zoom percentages being perceptibly physically different to the users within and across digital content and display screens. A normalized user experience is thus provided and those variables may effectively become constants where zoom is concerned.

As will be appreciated in light of this disclosure, an exact match in zoom behavior within a piece of content, or from one piece of content to another piece, or from one display screen to another display screen, or from one display window of a given display screen to another display window of that display screen, is not required. Rather, in some embodiments, there are no human-perceptible differences, with respect to a user having ordinary or average observation ability. An ordinary observer may be, for instance, a person who uses multiple computing devices (e.g., mobile computing device and laptop or desktop computer) to view content multiple times a day, for the likes of casual reading, email, work responsibilities, etc. In still other embodiments, there may be a negligible or otherwise acceptable degree of variation in zoom behavior. For instance, in accordance with some embodiments, if in one display screen or window an image of given content is one square inch at 100% zoom, the image of that content is also about one square inch (e.g., within an acceptable tolerance of one square inch, such as +/−20%, or +/−15%, or +/−10%, or +/−5%, or +/−2%) at 100% zoom in any another display screen or window. Likewise, if every zoom increase in one given display screen or window leads to the displayed content being one square inch bigger, then every zoom step in any another display screen or window will also make the content about one square inch bigger (e.g., within an acceptable tolerance of one square inch, such as the previous example tolerances). As will be further appreciated in light of this disclosure, any acceptable degree of variance need not be symmetrical or evenly distributed with respect to the height and width of the given content, display, or display window. For instance, the variance may be with respect to the height only, or width only, or some combination of height and width. In this last case, note that the variation percentage with respect to height need not be the same as the variation percentage with respect to width.

Computing Device

Figure 1A:
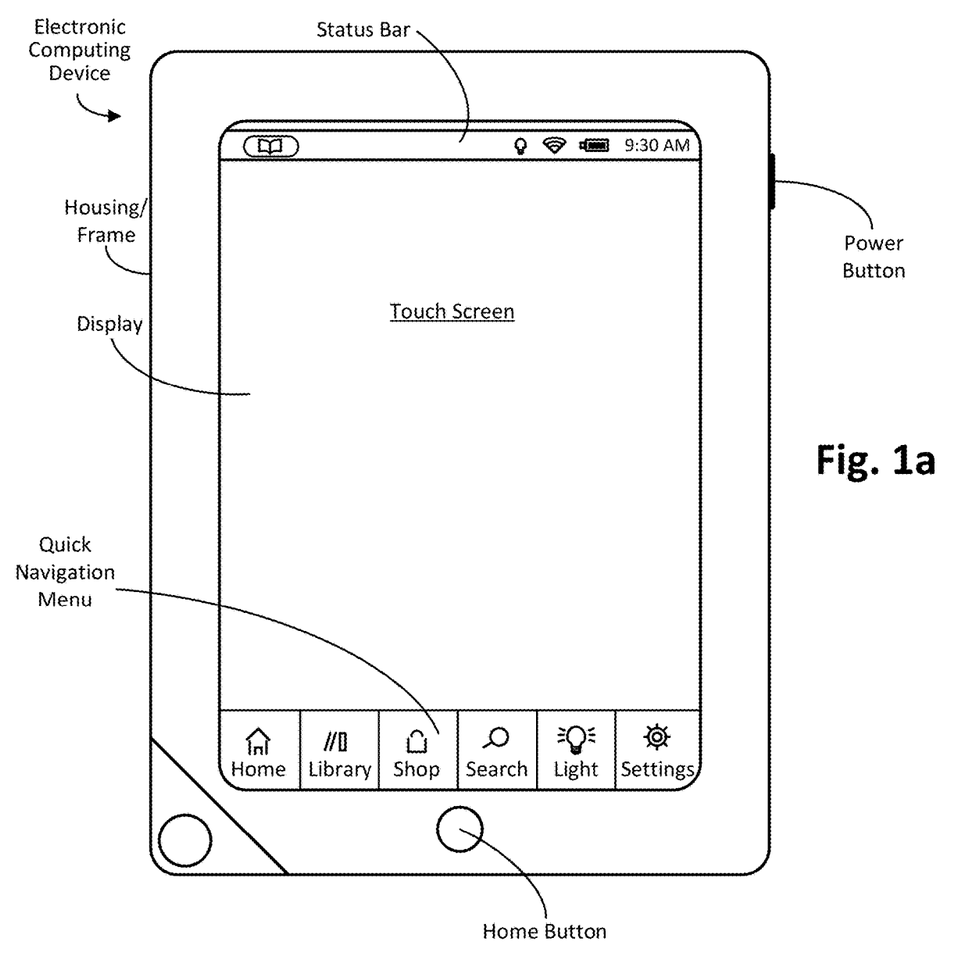
FIG. 1a illustrates an example electronic computing device, configured in accordance with an embodiment of the present invention.

FIG. 1a illustrates an example electronic computing device, configured in accordance with an embodiment of the present invention. The device could be, for example, a tablet such as the NOOK® tablet by Barnes & Noble® or any other tablet device. In a more general sense, the device may be any computing device or system capable of displaying digital content, such as a smart phone, eReader, laptop, set-top box and flat panel television, or desktop computer, for example. In some instances, the computing device may include a touch screen display, or a non-touch-sensitive display screen that can be used in conjunction with a touch-sensitive surface/interface such as a track pad and/or other user input devices such as a keyboard and mouse. As will be appreciated in light of this disclosure, the techniques provided herein are not intended to be limited to any particular kind or type of computing device or system. For ease of description, the term computing device is used herein to refer to any such computing arrangements. Further note that the computing device may include an integral display or an independent display.

As can be seen with the example embodiment shown in FIG. 1a, the device comprises a housing/frame that includes a number of hardware features such as a power button and a press-button or so-called home button. A touch screen based user interface (UI) is also provided in this embodiment, which in this example case includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Although the depicted computing device uses a touch screen display, other touch-sensitive embodiments may include a non-touch screen and a touch-sensitive surface such as a track pad, or a touch-sensitive housing configured with one or more acoustic sensors, etc. As will be further appreciated, the computing device need not be touch-sensitive and may receive input from physical buttons, directional pads, joysticks, mouse pointing devices, and physical keyboards, just to name a few other input device examples.

Continuing with the example computing device shown in FIG. 1a, the power button can be used to turn the device on and off, and may be used in conjunction with a touch-based UI control feature that allows the user to confirm a given power transition action request (e.g., such as a slide bar or tap point graphic to turn power off). In this example device, the home button is a physical press-button that can be used to display the device's home screen when the device is awake and in use. Note that the buttons as variously described herein may be physical, virtual, or some combination thereof, depending upon the embodiment. The home button may also be configured to cease an active function that is currently executing on the device. Numerous other configurations and variations will be apparent in light of this disclosure, and the present disclosure is not intended to be limited to any particular set of control features or device form factor.

Figure 1B:
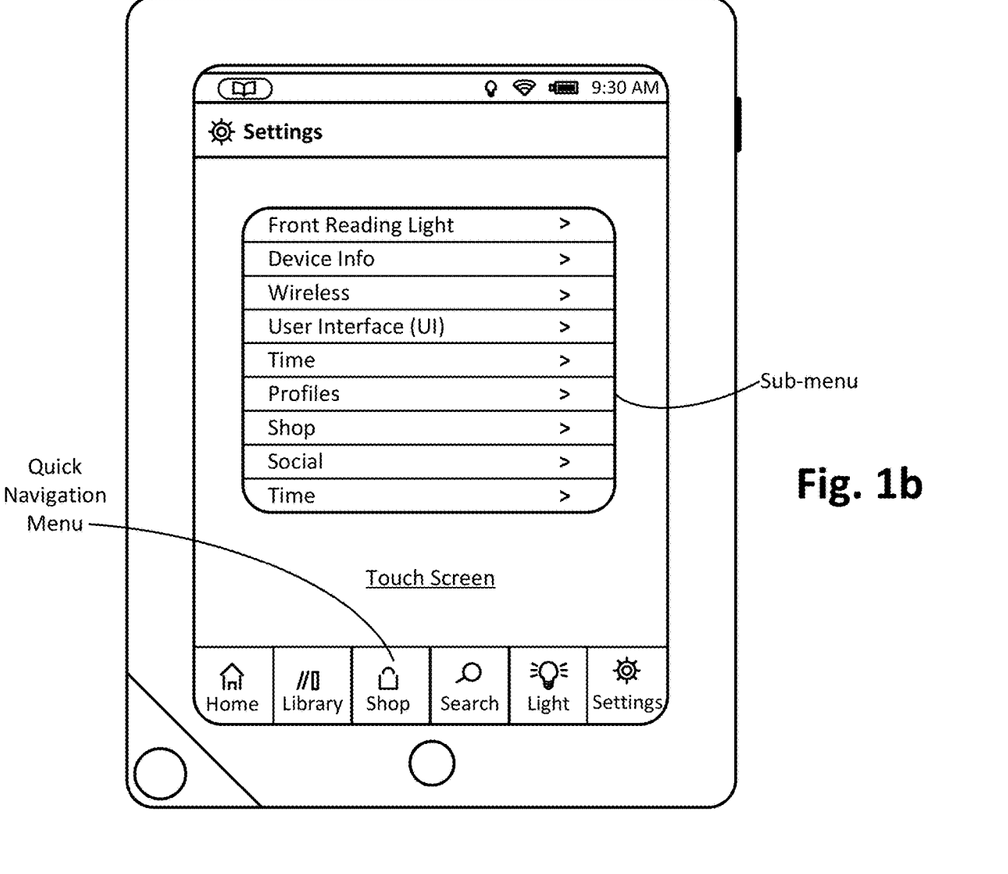
FIGS. 1b-c illustrate example configuration screen shots of the user interface of the computing device shown in FIG. 1a, in accordance with an embodiment of the present invention.

Continuing with the example embodiment of FIG. 1a, the user can access a configuration sub-menu by tapping or otherwise selecting the Settings option in the quick navigation menu, which causes the device in this embodiment to display the general sub-menu shown in FIG. 1b. From this general sub-menu the user can select any one of a number of options, including one designated User Interface (UI) in this specific example case. Selecting this sub-menu item (with, for example, an appropriately placed screen tap or mouse click) may cause the configuration sub-menu of FIG. 1c to be displayed, in accordance with an embodiment. In other example embodiments, selecting the User Interface (UI) option may present the user with a number of additional sub-options, one of which may include a zoom configuration option, which may then be selected by the user so as to cause the zoom configuration sub-menu of FIG. 1c to be displayed. Any number of such menu schemes and nested hierarchies can be used, as will be appreciated in light of this disclosure. In other embodiments, the universal zoom mode as described herein may be hard-coded such that no configuration is needed or otherwise permitted. The degree of hard-coding versus user-configurability can vary from one embodiment to the next, and the present disclosure is not intended to be limited to any particular configuration scheme of any kind, as will be apparent in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates one or more touches (whether direct or proximate and whether made by a user's fingertip, a stylus, or some other suitable implement) in a particular location(s) into an electrical signal, which is then received and processed by the underlying operating system (OS), system software, and circuitry (processor, etc) of the computing device. In some instances, note that the user need not actually physically touch the touch-sensitive surface to provide user input (e.g., when the touch-sensitive surface recognizes hovering input). In embodiments where the computing device is not-touch-sensitive, input may be provided using a mouse, joystick, or directional pad, and one or more buttons, for example, to provide input similar to touching a touch screen. In some embodiments, the UI may allow other user interactions, such as voice-commands. Additional example details of the underlying OS and circuitry in accordance with some embodiments will be discussed in turn with reference to FIG. 2a.

Continuing with FIG. 1b, once the Settings sub-menu is displayed, the user can then select the User Interface (UI) option. In response to such a selection, the zoom configuration sub-menu shown in FIG. 1c can be provided to the user. In this example case, the configuration sub-menu includes a UI check box that when checked or otherwise selected by the user, effectively enables the mode (shown in the Enabled state); unchecking the box disables the mode. Other embodiments may have the zoom mode always enabled, while in other embodiments the mode may be enabled or disengaged by a physical switch or button, or by a uniquely identifiable gesture or screen contact, for example. As can be seen in the example shown in FIG. 1c, the sub-menu includes a left section that allows a user to configure a number of options for the universal zoom mode and a right section that allows a user to enable/disable the universal zoom mode for various applications. The left section in this example sub-menu allows the user to select a Content Zoom Feature and an arbitrary Zoom Constant. The Content Zoom Feature is the feature of given content that will be defined or otherwise set based on the arbitrary Zoom Constant, and the Zoom Constant is the arbitrary constant (in pixels or other suitable units) that will be used to set the 100% zoom level against which all zoom steps will be computed.

Figure 1C:
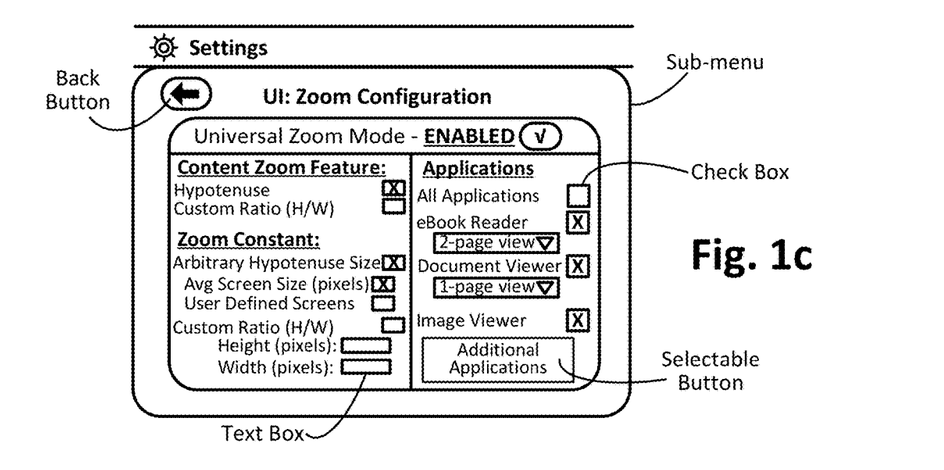

In this example embodiment of FIG. 1c, the Content Zoom Feature can be either the Hypotenuse of the given content or a Custom Ratio (H/W) of height and width of the given content. If the Hypotenuse is selected for the Content Zoom Feature (by checking the corresponding checkbox or some other suitable UI selection mechanism), then the Arbitrary Hypotenuse Size option under the Zoom Constant configuration can also be checked or selected (either by the user or automatically). Note that in some such embodiments, the Custom Ratio (H/W) options can be grayed-out or otherwise diminished from view so as to indicate they are no longer selectable options once the Hypotenuse option under the Content Zoom Feature configuration is selected (and vice-versa if the Custom Ratio (H/W) options are selected). As can be further seen, the Arbitrary Hypotenuse Size option has two sub-options in this example case: the Avg Screen Size (pixels) option and the User Defined Screens option. The Avg Screen Size (pixels) option may be a predetermined or hardcoded arbitrary hypotenuse size that is based on an average screen size of multiple common and arbitrary screen types, thereby providing the arbitrary Zoom Constant. On the other hand, the User Defined Screens option allows the user to identify each of the specific display devices with which she/he will be accessing content. In one such example case, in response to the User Defined Screens checkbox being checked, the user may be presented with a sub-screen that lists common display devices each of which has a known hypotenuse size in pixels (or some other units). The user can thus check or otherwise select each of her/his display devices, or manually enter an unlisted device along with its known hypotenuse size. In any case, the average hypotenuse size (or some other statistically representative value such as median hypotenuse size) of those user-identified display devices can be determined to be the arbitrary Zoom Constant. With further reference to FIG. 1c, if the Custom Ratio (H/W) is selected for the Content Zoom Feature, then the Custom Ratio (H/W) option under the Zoom Constant configuration can also be checked or selected. In this case, the user can enter the desired Height and Width (both in pixels in this example case) in the corresponding text boxes. The arbitrary Height and Width can then be used as the arbitrary Zoom Constant. The configuration options presented in this example embodiment are shown for illustrative purposes (e.g., to illustrate that one or more aspects of the universal zoom mode may be user-configurable) and the zoom mode may include additional and/or other customizable features or aspects, as will be apparent in light of this disclosure.

The right side of the settings sub-menu screen shot shown in FIG. 1c includes an Applications section that allows a user to individually enable the universal zoom mode for specific applications or even all applications, in this example embodiment. Such a configuration feature may be helpful, for instance, in a tablet or laptop or other multifunction computing device that can execute different applications (as opposed to a computing device that is more or less dedicated to a particular application). Note that, in some embodiments, the universal zoom mode may be application specific or implemented at a global level. As can be seen in the example screen shot shown in FIG. 1c, the mode is enabled for the eBook Reader, Document Viewer, and Image Viewer applications. As can be further seen, for each of the eBook Reader and Document Viewer applications, the user can specify the number of pages to be displayed at one time. In this example case, the user has selected the 2-page option for the eBook Reader application, so as to simultaneously display opposing pages to either side of a virtual central binder. In such cases, the Zoom Content Feature is with respect to two pages. In contrast, the user has selected the 1-page option for the Document Viewer application, so only one page content will be displayed at a time. Thus, in such cases, the Zoom Content Feature is with respect to one page. Other multi-page viewing schemes will be apparent in light of this disclosure, and the Zoom Content Feature can be configured accordingly. The settings screen of this example embodiment also includes an Additional Applications button that can be selected to allow a user to enable/disable the universal zoom mode for other applications. In some embodiments, the universal zoom mode may be later enabled for a particular application from this settings screen or enabled from within a specific application. Any number of applications or device functions may benefit from the universal zoom mode as variously provided herein, whether user-configurable or not, and the present disclosure is not intended to be limited to any particular application or set of applications.

As can be further seen, a back button UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1b and 1c show user configurability, other embodiments may not allow for any such configuration, wherein the various universal zoom features provided herein are hard-coded or otherwise provisioned by default. The degree of hard-coding versus user-configurability can vary from one embodiment to the next, and the present disclosure is not intended to be limited to any particular configuration scheme of any kind.

Architecture

Figure 2A:
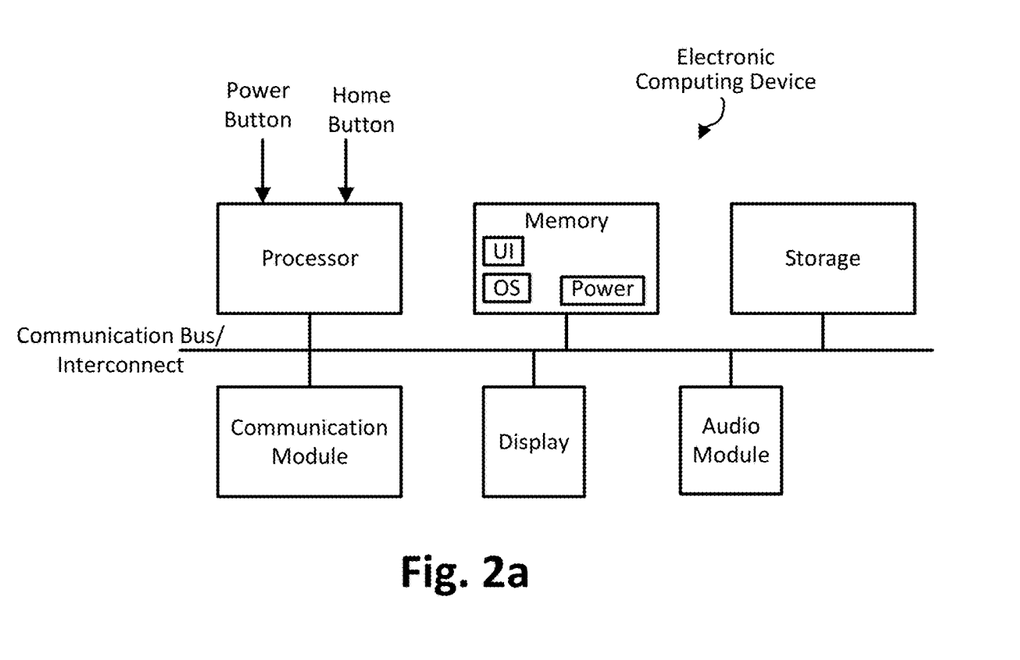
FIG. 2a illustrates a block diagram of an electronic computing device, configured in accordance with an embodiment of the present invention.

FIG. 2a illustrates a block diagram of a computing device configured in accordance with an embodiment of the present invention. As can be seen, this example device includes a processor, memory (e.g., RAM and/or ROM for processor workspace and storage), additional storage/memory (e.g., for content), a communications module, a display screen, and an audio module. A communications bus and interconnect is also provided to allow inter-device communication. Other typical componentry and functionality not reflected in the block diagram will be apparent (e.g., battery, co-processor, etc.). The principles provided herein equally apply to any computing device.

The display may be, for example, a touch-sensitive display or touch screen. In some embodiments, the touch screen display can be configured with a purely capacitive sensor, while in other embodiments the touch screen display may be configured to provide a hybrid mode that allows for both capacitive input and active stylus input. In any such embodiments, a touch screen controller may be configured to selectively scan the touch screen display and/or selectively report contacts detected directly on or otherwise sufficiently proximate to (e.g., within a few centimeters) the touch screen display. The proximate contact may include, for example, hovering input used to cause location specific input as though direct contact were being provided on a touch-sensitive surface (such as a touch screen). Numerous touch screen display configurations can be implemented using any number of known or proprietary screen based input detecting technology. The display can be implemented, for example, with a 7 to 9 inch 1920×1280 in-plane switching (IPS) LCD touchscreen touch screen, or any other suitable display and touch-sensitive interface technology. In still other embodiments, the display is a regular non-touch sensitive display (and LED display of a laptop or a stand-alone display that is operatively connected to a computer housing that includes the processor, memory, storage, communication module, and audio module).

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium (e.g., RAM or ROM), that when executed by the processor (and/or co-processors), carries out the functionality of the device, including the universal zoom mode as variously described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button, home button, touch-sensitive surface, or other user input devices such as from a mouse or keyboard. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The communications module can be, for instance, any suitable 802.11 b/g/n WLAN chip or chip set, which allows for connection to a local network so that content can be downloaded to the device from a remote location (e.g., content provider, etc., depending on the application of the computing device). In some specific example embodiments, the device housing or frame that contains all the various componentry measures about 7" to 9" high by about 5" to 6" wide by about 0.5" thick, and weighs about 7 to 8 ounces. Any number of suitable form factors can be used, depending on the target application (e.g., laptop, smart phone, etc.). The device may, for example, smaller for smart phone and eReader applications and larger for tablet computer applications.

The operating system (OS) module can be implemented with any suitable OS, but in some example embodiments is implemented with Google Android OS or Linux OS or Microsoft OS or Apple OS. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The audio module can be configured, for example, to speak or otherwise aurally present a selected eBook or other textual content. In some example cases, if additional space is desired, for example, to store digital books or other content and media, storage can be expanded via a microSD card or other suitable memory expansion technology (e.g., 32 GBytes, or higher). The UI module can be, for example, based on touch screen technology, and the various example screen shots and example use-cases shown in FIGS. 1*a-c*, 3*a*, and 4*a-f*, in conjunction with the methodology demonstrated in FIG. 5, which will be discussed in turn.

Client-Server System

Figure 2B:
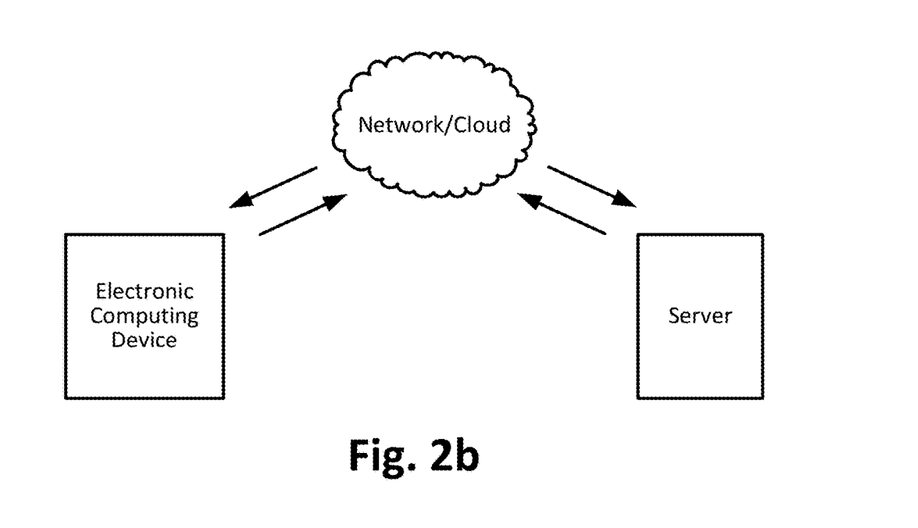
FIG. 2b illustrates a block diagram of a communication system including the electronic computing device of FIG. 2a, configured in accordance with an embodiment of the present invention.

FIG. 2*b* illustrates a block diagram of a communication system including the electronic computing device of FIG. 2*a* configured in accordance with an embodiment of the present invention. As can be seen, the system generally includes an electronic computing device that is capable of communicating with a server via a network/cloud. In this example embodiment, the computing device may be, for example, an eReader, a smart phone, a laptop, a tablet computer, a desktop computer, or any other suitable computing device. The network/cloud may be a public and/or private network, such as a private local area network operatively coupled to a wide area network such as the Internet. In this example embodiment, the server may be programmed or otherwise configured to receive content requests from a user via the computing device and to respond to those requests by providing the user with requested or otherwise recommended content. In some such embodiments, the server may be configured to remotely provision the universal zoom mode as variously provided herein to the computing device (e.g., via JavaScript or other browser based technology). In other embodiments, portions of the methodology may be executed on the server and other portions of the methodology may be executed on the device. Numerous server-side/client-side execution schemes can be implemented to facilitate the universal zoom mode as disclosed herein, as will be apparent in light of this disclosure.

Content Zoom Feature

Figure 3:
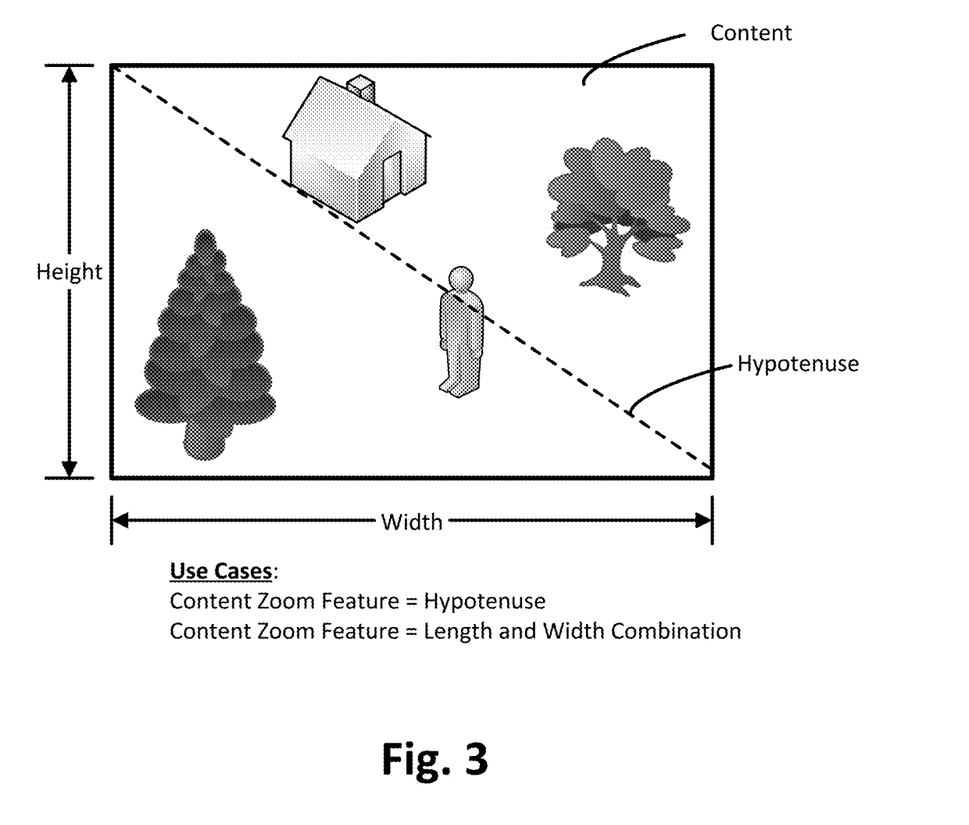
FIG. 3 illustrates a piece of content having an aspect ratio (height/width) and a hypotenuse that can be set or otherwise used for purposes of zooming, in accordance with an embodiment of the invention.

FIG. 3 illustrates a piece of content having an aspect ratio (height/width) and a hypotenuse that can be set or otherwise used for purposes of zooming, in accordance with an embodiment of the invention. As will be appreciated in light of this disclosure, although the example depicted in FIG. 3 is a digital photo or image, the content may be any type of digital content, such as a photo or image (e.g., file.jpeg), a word processor document (e.g., file.docx), a multimedia document (e.g., file.pdf), a video or movie (e.g., file.mpeg), a web page (e.g., file.html), an eBook (e.g., file.epub), a slide-based presentation (e.g., file.ppt), an email (e.g., file.msg), or a spreadsheet (e.g., file.xls), to name a few examples. As can be seen, the content has an aspect ratio (height/width) and a hypotenuse. In general, any given piece of content to be displayed, regardless of type, can be at least partially defined in terms of a height, width, and hypotenuse each of which can be measured in a given unit, such as pixels, inches, millimeters, etc.

As previously explained with reference to FIG. 1*c*, the hypotenuse or the combination of height and width of a given piece of content can be used as the Content Zoom Feature that is defined or otherwise set based on the arbitrary Zoom Constant. Further recall that the Zoom Constant is the arbitrary constant (in pixels or other suitable units) that will be used to set the 100% zoom level against which all zoom steps are computed, in accordance with an embodiment of the present invention. So, in one example case, the hypotenuse of the content to be initially displayed can be set to the hypotenuse size indicated by the Zoom Constant. Then, any subsequent zoom step can be computed against that initially sized content. In a similar fashion, the height and width of the content to be initially displayed can be set to the height and width indicated by the Zoom Constant, and any subsequent zoom step can be computed against that initially sized content. For example, a zoom step calling for a 25% size increase would increase the size of the hypotenuse of the currently displayed content by 25% (assuming the hypotenuse is the Content Zoom Feature). Likewise, a zoom step calling for a 50% size decrease would decrease the size of both the height and width of the currently displayed content by 50% (assuming the combination of height and width is the Content Zoom Feature). And so on, and so on.

In some cases, the content may be paginated and include multiple pages where each page is separately displayable, such as an electronic book or so-called eBook. In such cases, the Content Zoom Feature (e.g., height-width combination or hypotenuse of the content) is with respect to a given number of pages of that multi-page document, in accordance with an embodiment. In some such cases, the given number of pages is user-configurable, as discussed with reference to FIG. 1*c*. In any case, each page or page group of that content will have that Content Zoom Feature when initially displayed, and can be zoomed from there as desired based on the arbitrary zoom constant. In other cases where the content is a single but relatively long (height) and/or wide (width) page, such as a web page that cannot be displayed all at once and is scrollable in at least one of the vertical and horizontal directions, the initial display at 100% zoom may need to be zoomed in one or more zoom steps to be more viewable, depending on how long or wide the content at a viewable zoom level.

Zoom Constant

Figure 4A:
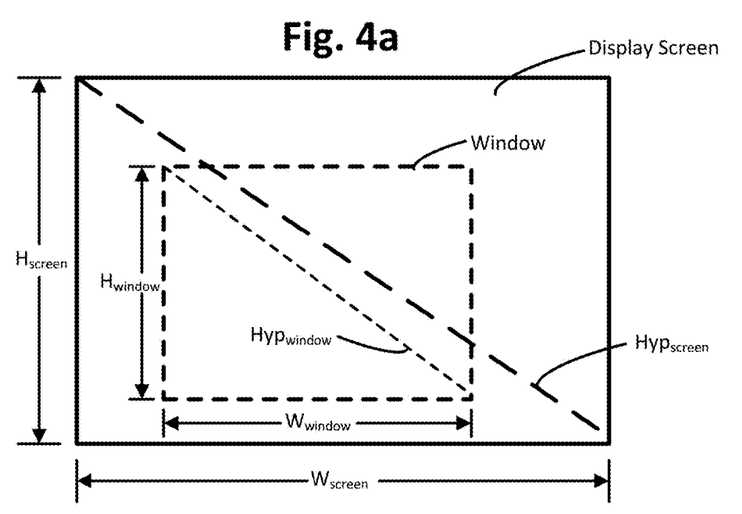
FIG. 4a illustrates an example display screen and window, each having an aspect ratio (height/width) and a hypotenuse that can be used to determine an arbitrary Zoom Constant, in accordance with an embodiment of the invention.
Figure 4B:
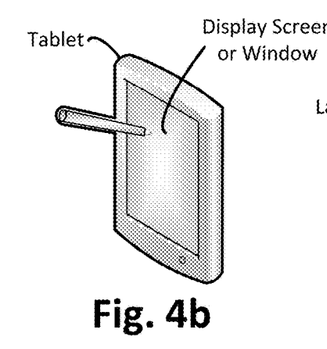
FIGS. 4b-4f each illustrates an example display device that can show zoomed content, in accordance with an embodiment of the present invention.
Figure 4C:
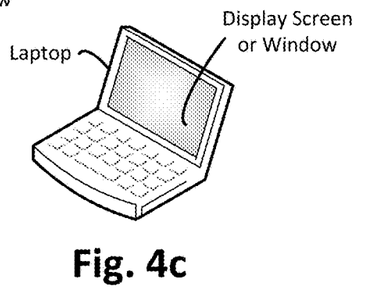
Figure 4D:
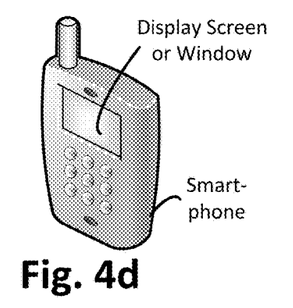

FIG. 4a illustrates an example display screen and window, each having an aspect ratio (height/width) and a hypotenuse that can be used to determine an arbitrary Zoom Constant, in accordance with an embodiment of the invention. As can be seen, the physical display screen has a height ($H_{screen}$) and width ($W_{screen}$), as well as a hypotenuse ($Hyp_{screen}$). Likewise, the virtual window has a height ($H_{window}$) and width ($W_{window}$), as well as a hypotenuse ($Hyp_{window}$). Just as with digital content, any given physical display or virtual window, regardless of type, can be at least partially defined in terms of a height, width, and hypotenuse each of which can be measured in a given unit, such as pixels, inches, millimeters, etc. As previously noted, many operating systems automatically resize a given virtual window within a physical screen depending on context, or allow the user to resize that virtual window. To this end, the size of such windows is known or can otherwise be determined. Once dimensions (e.g., height, width, hypotenuse, in pixels) of the various physical displays and virtual windows are known, those dimensions can be used to compute an arbitrary Zoom Constant, in accordance with an embodiment.

Figure 4E:
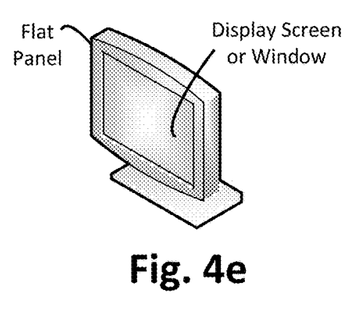
Figure 4F:
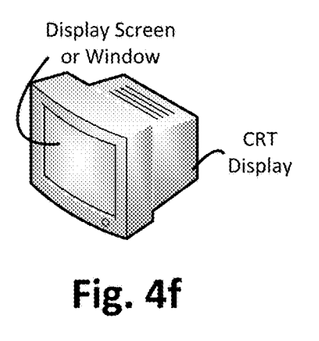

In one example case, the arbitrary Zoom Constant is an average hypotenuse size of various physical displays and virtual windows. In another example case, there are two arbitrary Zoom Constants, one being an average hypotenuse size of various physical displays and the other being an average hypotenuse size of the various virtual windows. The various physical displays and virtual windows can be identified by the user, automatically detected or inferred, or otherwise estimated. FIGS. 4b-4f each illustrates an example display device that can show zoomed content, in accordance with an embodiment of the present invention. As can be seen, FIGS. 4b-d each shows a portable computing device, including a tablet, laptop, and smartphone, respectively. FIG. 4e illustrates a typical LED or flat panel display or television screen, and FIG. 4f illustrates a typical CRT display. Each of these displays has a physical screen size for displaying content, and can further be used to display a virtual window in which content is displayed.

Universal Zoom Mode Methodology

Figure 5:
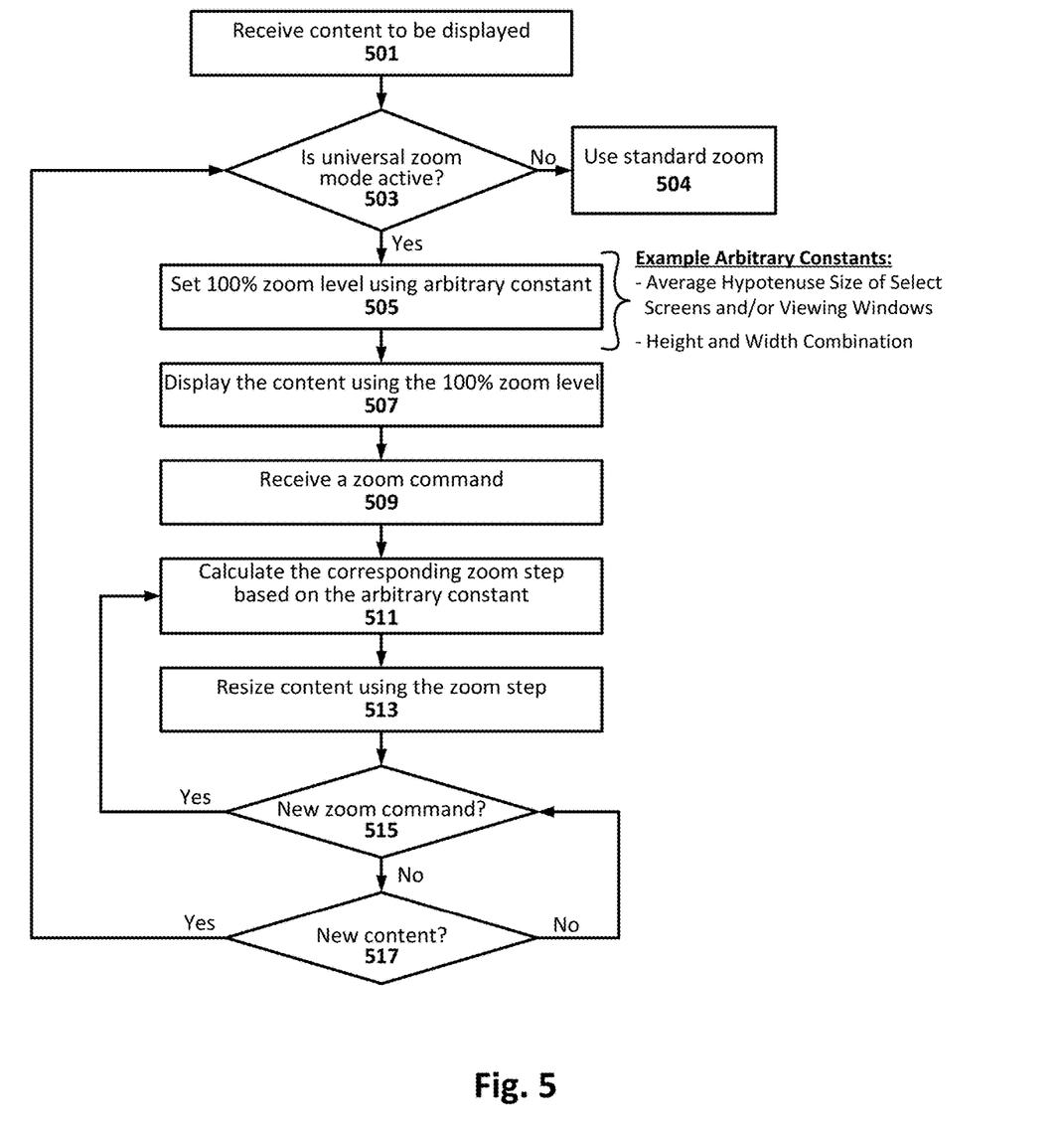
FIG. 5 illustrates a method for zooming content in an electronic display system, in accordance with an embodiment of the present invention.

FIG. 5 illustrates a method for zooming content in an electronic display system, in accordance with an embodiment of the present invention. The example methodology may be implemented, for instance, by the UI module of the example computing device shown in FIG. 2a, or the example computing device shown in FIG. 2b (e.g., with the UI provisioned to the client by the server). To this end, the UI may be implemented in software, hardware, firmware, or any suitable combination thereof, as will be appreciated in light of this disclosure. The computing device itself may be, for example, a mobile computing device with an integrated display screen, such as a tablet, laptop, or smartphone. Alternatively, the computing device may not be mobile and/or may be operatively connected to an external display screen, such as a desktop computer or a set-top box and television arrangement. In any such cases, the method can be executed on the given computing device so as to provide universal zoom mode functionality.

The method includes receiving 501 content to be displayed. As previously explained, the content can be any type of digital content, and may be paginated so as to include separately displayable pages, or an un-paginated single page of content. For paginated content, a single page may be displayed at any one time in some cases, or multiple pages (generally referred to herein as a page group) may be displayed at the same time in other cases (such as in the case of simultaneously displaying opposing pages to either side of a virtual central binder in an eReader application so as to simulate a real book reading experience). As will be appreciated in light of this disclosure, the designated Zoom Content Feature (e.g., hypotenuse or height-width combination or other suitable feature of the target content that can be set based on the Zoom Constant) is with respect to the desired number of content pages to be displayed at any one time, whether that number be one page, two pages, or more.

The method optionally continues with determining 503 if the universal zoom mode is active. If not, the method continues with using 504 standard zoom functionality. On the other hand, if the universal zoom mode is active or otherwise engaged, then the method continues with implementing the universal zoom mode as will be discussed in turn with reference to 505-517. In other embodiments, note that the universal zoom mode may always be active, such that the determination at 503 is not necessary.

The method continues with setting 505 the initial or so-called 100% zoom level using an arbitrary constant. As previously explained, in one embodiment, this entails setting the hypotenuse (Content Zoom Feature) of the target content to be displayed to be the size designated by the Zoom Constant. In still another embodiment, this entails setting the height and width (Content Zoom Feature) of the target content to be displayed to be the sizes designated by the Zoom Constant. In this latter case, note that the Zoom Constant can include multiple values, one for each aspect of a multi-faceted Content Zoom Feature (e.g., height and width, or height and hypotenuse, or width and hypotenuse). Further note that Pythagorean's theorem can be used to compute missing data, as desired. In some specific embodiments, the arbitrary Zoom Constant can be based on an average or median hypotenuse size of the physical display and/or virtual window sizes as previously explained. Other statistically representative hypotenuse sizes can be used, as will be appreciated.

The method continues with displaying 507 the content using the 100% zoom level, and sometime thereafter receiving 509 a zoom command. The zoom command can be provided by any suitable user input or as otherwise normally done, such as by a two-finger spread gesture or the simultaneous pressing of the CTRL key and turning of a mouse scroll wheel, or the pressing of a zoom-in or zoom-out control button, to name a few. As known, in computing devices including a touch screen or other touch-sensitive interface, the computing device can detect contact, whether direct or proximate (e.g., via hovering input), which can be used in various ways to implement UI functionality, including opening digital content to consume it, performing a zoom command, or other input.

The method continues with calculating 511 the zoom step corresponding to the requested zoom command based on the arbitrary constant, and then resizing 513 the currently displayed content using the zoom step. So, for example, if the arbitrary constant is a hypotenuse size of 300 pixels and the zoom command is a 20% increase, then the content currently displayed is zoomed so that its hypotenuse is effectively 360 pixels. A subsequent zoom step would be calculated against the now currently displayed hypotenuse size of 360 pixels. In another example, if the arbitrary constant is a height of 250 pixels and a width of 200 pixels and the zoom command is a 10% decrease, then the content currently displayed is zoomed out so that its height is effectively 225 pixels and its width is effectively 180 pixels. A subsequent zoom step would be calculated against the now currently displayed height of 225 pixels and width of 180 pixels. Numerous other example zoom-based use cases will be apparent in light of this disclosure.

The method continues with determining 515 if a new zoom command is received. As previously noted, each subsequent zoom command is executed against the currently displayed content which will have a Content Zoom Feature sized according to the last executed zoom step. In this sense, the initial size of the Content Zoom Feature set by the arbitrary Zoom Constant is updated at each subsequent zoom step. If a new zoom command is received, the method repeats at 511 and continues from there. If not, then the method continues with determining 517 if new content has been received. If so, the method repeats at 503 (or 505, as the case may be) and continues from there. Thus, a user may provide user input to cause the display of a new page or page group and zoom in and out of that content as desired.

Various advantages of the disclosed techniques will be apparent. For instance, content may come in various original sizes. If the 100% size initially displayed is set to the original size of the content, and the zoom steps are in percentages as per standard, then the zoom steps will vary between pieces of content. Additionally, the variance in original size means that 100% is different for different for each piece of content and the user can't associate a particular zoom percentage as optimal. In addition, some content has different aspect ratios and, for ease of computation, the zoom percentages are percentages of height or width, which would means that content made in portrait will zoom at different steps than content in landscape. In addition, if the content is fit to the window size and that size is called the 100% size, then the percentages and zoom levels will change if the user resizes their window or uses another device/screen. Hence, an in accordance with an embodiment of the present disclosure, a solution is provided to resolve all these variables and provide zooming consistency and predictable behavior for the user. Using a Content Zoom Feature (such as a hypotenuse or height-width combination) of the content instead of height or width to calculate percentages and zoom effectively controls for aspect ratios. In addition, choosing an arbitrary Zoom Constant (such a hypotenuse size or a height-width size combination in pixels or other suitable units) as 100% both for initial display to the user and to determine the zoom steps allows for consistency across content sizes, as well as true meaning to the percentages (for the user) as percentages will be consistent across screen sizes and content sizes. Note that original content dimensions can be stored or otherwise preserved for resolution sake.

Numerous variations and embodiments will be apparent in light of this disclosure. One example embodiment of the present invention provides a method for zooming content in an electronic display system. The method includes receiving content to be displayed, and setting an initial zoom level using an arbitrary constant that is independent of the content to be displayed. The method continues with displaying the content using the initial zoom level, and in response to a zoom command, resizing the displayed content using a zoom step that is computed against the arbitrary constant. In some cases, the content to be displayed is paginated and the initial zoom level and zoom step are applied to a single page or page group of the content, such that only a single page or page group are displayed at any one time. In some cases, content to be displayed has a height, width, and hypotenuse, and the arbitrary constant defines the initial size of the hypotenuse, and each zoom step is computed against a currently displayed hypotenuse size. In some cases, content to be displayed has a height, width, and hypotenuse, and the arbitrary constant defines the initial sizes of the height and width, and each zoom step is computed against a currently displayed height-width size combination. In some cases, the arbitrary constant is based on a statistically representative hypotenuse size computed from a plurality of hypotenuse sizes of different physical displays and/or virtual windows. In still other example cases, the arbitrary constant is based on a statistically representative height-width size combination computed from a plurality of height-width size combinations of different physical displays and/or virtual windows.

Another example embodiment of the present invention provides a computer program product comprising a plurality of instructions non-transiently encoded thereon that when executed by one or more processors cause a process for zooming content in an electronic display system to be carried out. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to set an initial zoom level using an arbitrary constant that is independent of content to be displayed, and present for display the content using the initial zoom level. In response to a zoom command, the process is further configured to resize the content presented for display using a zoom step that is computed against the arbitrary constant. In some cases, wherein the content to be displayed is paginated and the initial zoom level and zoom step are applied to a single page or page group of the content, such that only a single page or page group are displayed at any one time. In some cases, content to be displayed has a height, width, and hypotenuse, and the arbitrary constant defines the initial size of the hypotenuse, and each zoom step is computed against a currently displayed hypotenuse size. In one specific such case, the arbitrary constant is a statistically representative hypotenuse size computed from a plurality of hypotenuse sizes of different physical displays and/or virtual windows. In some cases, content to be displayed has a height, width, and hypotenuse, and the arbitrary constant defines the initial sizes of the height and width, and each zoom step is computed against a currently displayed height-width size combination. In one specific such case, the arbitrary constant is based on a statistically representative height-width size combination computed from a plurality of height-width size combinations of different physical displays and/or virtual windows. In some cases, the computer program product comprises a universal zoom mode for an eReader application.

Another embodiment of the present invention provides a computing system. The system includes a processor and a memory for storing a zoom mode application executable by the processor to: set an initial zoom level using an arbitrary constant that is independent of content to be displayed, and present for display the content using the initial zoom level. In response to a zoom command, the zoom mode application is further executable by the processor to resize the content presented for display using a zoom step that is computed against the arbitrary constant. In some cases, the content to be displayed is paginated and the initial zoom level and zoom step are applied to a single page or page group of the content, such that only a single page or page group are displayed at any one time. In some cases, content to be displayed has a height, width, and hypotenuse, and the arbitrary constant defines the initial size of the hypotenuse, and each zoom step is computed against a currently displayed hypotenuse size. In one such case, the arbitrary constant is a statistically representative hypotenuse size computed from a plurality of hypotenuse sizes of different physical displays and/or virtual windows. In some cases, content to be displayed has a height, width, and hypotenuse, and the arbitrary constant defines the initial sizes of the height and width, and each zoom step is computed against a currently displayed height-width size combination. In one such case, the arbitrary constant is based on a statistically representative height-width size combination computed from a plurality of height-width size combinations of different physical displays and/or virtual windows. In some cases, the system is a mobile computing device having an integral display screen (such as a tablet, eReader, or smartphone).

The foregoing description of the embodiments of the present disclosure have been presented for the purposes of illustration and description. It is not intended to be exhaustive or to limit the disclosure to the precise forms disclosed. Many modifications and variations are possible in light of this disclosure. It is intended that the scope of the present invention be limited not by this detailed description, but rather by the claims appended hereto.

What is claimed is:

1. A method for zooming content in an electronic display system, the method comprising:
   receiving content;
   setting an initial zoom level using an arbitrary constant that is (a) independent of the content, and (b) determined based on a plurality of known sizes of different displays;
   displaying the content using the initial zoom level; and
   in response to a zoom command, resizing the displayed content using a zoom step that is computed against the arbitrary constant.

2. The method of claim 1, wherein the arbitrary constant is based on an average of the plurality of known sizes of the different displays.

3. The method of claim 1, wherein the arbitrary constant is based on a median of the plurality of known sizes of the different displays.

4. The method of claim 1, wherein the plurality of known sizes includes at least one size selected from a group consisting of a hypotenuse size and a height-width size combination.

5. The method of claim 1, wherein the plurality of known sizes includes a plurality of known sizes of different physical displays or virtual windows or both physical displays and virtual windows.

6. The method of claim 1, further comprising receiving the plurality of known sizes of different displays.

7. The method of claim 1, further comprising receiving user input that identifies at least a portion of the different displays.

8. At least one non-transitory computer readable storage medium having instructions encoded thereon that, when executed by one or more processors, result in operations for zooming content in an electronic display system, the operations comprising:
   set an initial zoom level using an arbitrary constant that is (a) independent of content to be displayed, and (b) determined based on a plurality of known sizes of different displays;
   display the content using the initial zoom level; and
   in response to a zoom command, resize the displayed content using a zoom step that is computed against the arbitrary constant.

9. The at least one non-transitory computer readable medium of claim 8, wherein the operations provide a universal zoom mode for an electronic reader application.

10. The at least one non-transitory computer readable medium of claim 8, wherein the operations further comprise receive the content to be displayed.

11. The at least one non-transitory computer readable medium of claim 8, wherein the operations further comprise receive a user selection that defines the plurality of known sizes.

12. The at least one non-transitory computer readable medium of claim 8, wherein the operations further comprise receive user input that identifies at least a portion of the different displays.

13. The at least one non-transitory computer readable medium of claim 8, wherein the plurality of known sizes includes a plurality of known sizes of different physical displays.

14. The at least one non-transitory computer readable medium of claim 8, wherein the plurality of known sizes includes a plurality of known sizes of different virtual windows.

15. A computing system comprising:
   one or more processors; and
   a memory for storing a zoom mode application that is executable by the one or more processors to:
      set an initial zoom level using an arbitrary constant that is (a) independent of content to be displayed, and (b) predetermined based on multiple display sizes,
      display the content using the initial zoom level, and
      in response to a zoom command, resize the displayed content using a zoom step that is computed against the arbitrary constant.

16. The computing system of claim 15, wherein the content to be displayed is paginated and the initial zoom level and zoom step are applied to one or more pages of the content, such that only a single page is displayed at any one time.

17. The computing system of claim 15, wherein the system is a mobile computing device having an integrated display screen.

18. The computing system of claim 15, wherein the zoom mode application is executable by the one or more processors to further receive the content to be displayed.

19. The computing system of claim 15, wherein the multiple display sizes include a at least one physical display size and at least one virtual window size.

20. The computing system of claim 15, wherein the multiple display sizes include at least one size selected from a group consisting of a hypotenuse size and a height-width size combination.

* * * * *